US008792653B2

(12) United States Patent
Suzuki et al.

(10) Patent No.: US 8,792,653 B2
(45) Date of Patent: Jul. 29, 2014

(54) SIGNAL PROCESSING APPARATUS AND METHOD

(75) Inventors: Shiro Suzuki, Kanagawa (JP); Kazunobu Ohkuri, Kanagawa (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 13/208,120

(22) Filed: Aug. 11, 2011

(65) Prior Publication Data

US 2012/0057723 A1 Mar. 8, 2012

(30) Foreign Application Priority Data

Sep. 2, 2010 (JP) ................................ P2010-196646

(51) Int. Cl.
*H04B 15/00* (2006.01)

(52) U.S. Cl.
USPC ............ 381/94.7; 381/122; 381/94.1; 381/74

(58) Field of Classification Search
USPC ................ 381/71.1, 71.6, 74, 94.1–94.7, 122
See application file for complete search history.

(56) References Cited

U.S. PATENT DOCUMENTS 5,537,668 A * 7/1996 Nambu et al. ................. 381/102
2008/0085010 A1 4/2008 Suzuki

FOREIGN PATENT DOCUMENTS

JP 2007-214726 8/2007
JP 2007-235670 9/2007
JP 2008-98737 4/2008

* cited by examiner

*Primary Examiner* — Disler Paul
(74) *Attorney, Agent, or Firm* — Sony Corporation

(57) ABSTRACT

A signal processing apparatus includes a first audio output unit configured to output audio of a first audio signal input from a first signal input line, a first pickup unit connected to the first signal input line, a second audio output unit configured to output audio of a second audio signal input from a second signal input line, a second pickup unit connected to the second signal input line, a connecting line that connects the above units to ground, and a first reducing unit configured to at least reduce a first sound leakage signal, being the first audio signal leaking into the second signal input line from the first audio output unit, by using the first audio signal, or reducing a second sound leakage signal, being the second audio signal leaking into the second signal input line from the second audio output unit, by using the second audio signal.

9 Claims, 9 Drawing Sheets

SIGNAL PROCESSING APPARATUS AND METHOD

BACKGROUND

The present technology relates to a signal processing apparatus and method, and more particularly, to a signal processing apparatus and method configured to enable higher left/right headphone channel separation.

Hitherto, headphones using a three-contact connector are generally established. The market for such headphones is expanding due to widespread growth and prevalence of portable audio players.

However, in headphones with a three-contact connector, since the ground that feeds back an audio signal is shared with the left and right channels, sound leakage between the left and right headphones may occur. This sound leakage may occur because of the combination of the headphones having a three-contact connector configuration and the amplifying characteristics or resistance included in the cable, etc. If sound leakage occurs during audio playback with headphones, the audio from the left and right channels may become mixed, and audio that differs from the original audio may be played back.

Thus, technologies that prevent such sound leakage have been proposed (see Japanese Unexamined Patent Application Publication Nos. 2007-214726, 2007-235670, and 2008-98737, for example). For example, Japanese Unexamined Patent Application Publication No. 2007-214726 discloses reducing sound leakage of a right-channel signal into a left-channel headphone by adding to the left-channel signal a right-channel signal that has been decreased according to a ratio of sound leakage into the left-channel headphone.

SUMMARY

Meanwhile, in recent years, music players, etc. having noise-cancelling functions are being developed and sold. With such music players, microphones are provided in the left and right headphones, and ambient noise is picked up by these microphones and transmitted to the music player. Then, the music player produces an audio signal in antiphase with the noise and causes the produced signal to be played back in superposition with the audio signals in the left and right headphones, thereby cancelling the ambient noise.

With such music players having noise-cancelling functions, a connector with an additional two contacts is used in order to connect the left and right microphones to the music player main unit, even if ground is shared with a common three-contact connector. For this reason, realizing a music player having noise-cancelling functions involves using a five-contact connector, for example.

However, with a five-contact connector, sound leakage of the music signal from one channel into the headphone for the other channel may occur due to a shared ground, similarly to the case of a three-contact connector. Furthermore, with a five-contact connector, sound leakage passing through the microphone circuits and into the left and right headphones may occur. For this reason, sufficient sound leakage prevention advantages may not be obtained with the technologies discussed above.

In light of such circumstances, technology enabling further reduction in headphone sound leakage is desirable.

A signal processing apparatus in accordance with an embodiment of the present technology is provided with a first audio output unit configured to output audio on the basis of a first audio signal input from a first signal input line, a first pickup unit, connected to the first signal input line, and configured to pick up ambient audio, a second audio output unit configured to output audio on the basis of a second audio signal input from a second signal input line, a second pickup unit, connected to the second signal input line, and configured to pick up ambient audio, a connecting line that connects the first audio output unit, the second audio output unit, the first pickup unit, and the second pickup unit to ground, and a first reducing unit configured to at least reduce a first sound leakage signal, which is the first audio signal leaking into the second signal input line from the first audio output unit via the connecting line and the second pickup unit, by using the first audio signal, or reducing a second sound leakage signal, which is the second audio signal leaking into the second signal input line from the second audio output unit via the connecting line and the second pickup unit, by using the second audio signal.

The first reducing unit may reduce the first sound leakage signal by adding the first audio signal, attenuated on the basis of a sound leakage ratio of the first audio signal leaking into the second pickup unit from the connecting line, to the first sound leakage signal.

The signal processing apparatus may be additionally provided with a noise-cancelling unit, provided between the second signal input line and the second pickup unit, and configured to perform filter processing on the ambient audio signal picked up by the second pickup unit, generate a noise-cancelling signal for outputting audio from the second audio output unit that cancels out the ambient audio, and output the noise-cancelling signal to the second audio output unit via the second signal input line. The first reducing unit may add the attenuated first audio signal to the first sound leakage signal input into the noise-cancelling unit from the second pickup unit.

The first reducing unit may reduce the second sound leakage signal by adding the second audio signal, attenuated on the basis of a sound leakage ratio of the second audio signal leaking into the second pickup unit from the connecting line, to the second sound leakage signal.

The signal processing apparatus may be additionally provided with a noise-cancelling unit, provided between the second signal input line and the second pickup unit, configured to perform filter processing on the ambient audio signal picked up by the second pickup unit, generate a noise-cancelling signal for outputting audio from the second audio output unit that cancels out the ambient audio, and output the noise-cancelling signal to the second audio output unit via the second signal input line. The first reducing unit may add the attenuated second audio signal to the second sound leakage signal input into the noise-cancelling unit from the second pickup unit.

The signal processing apparatus may be additionally provided with a second reducing unit, provided between the first signal input line and the second signal input line, and configured to attenuate the first audio signal to which a signal generated from a signal of ambient audio picked up by the first pickup unit has been added on the first signal input line, on the basis of a sound leakage ratio of the first audio signal leaking into the second audio output unit from the first audio output unit via the connecting line, and outputting the attenuated first audio signal to the second signal input line.

A signal processing method in accordance with an embodiment of the present technology is a signal processing method for a signal processing apparatus, the signal processing apparatus including a first audio output unit configured to output audio on the basis of a first audio signal input from a first signal input line, a first pickup unit, connected to the first signal input line, and configured to pick up ambient audio, a second audio output unit configured to output audio on the basis of a second audio signal input from a second signal input line, a second pickup unit, connected to the second signal input line, and configured to pick up ambient audio, a connecting line that connects the first audio output unit, the second audio output unit, the first pickup unit, and the second pickup unit to ground, and a reducing unit configured to at least reduce a first sound leakage signal, which is the first audio signal leaking into the second signal input line from the first audio output unit via the connecting line and the second pickup unit, by using the first audio signal, or reducing a second sound leakage signal, which is the second audio signal leaking into the second signal input line from the second audio output unit via the connecting line and the second pickup unit, by using the second audio signal. The method includes the first audio output unit outputting audio on the basis of the first audio signal input from the first signal input line, the second audio output unit outputting audio on the basis of the second audio signal input from the second signal input line, and the reducing unit at least reducing the first sound leakage signal by using the first audio signal, or reducing the second sound leakage signal by using the second audio signal.

In an embodiment of the present technology, audio is output from a first audio output unit on the basis of a first audio signal input from a first signal input line. Ambient audio is picked up by a first pickup unit connected to the first signal input line. Audio is output from a second audio output unit on the basis of a second audio signal input from a second signal input line. Ambient audio is picked up by a second pickup unit connected to the second signal input line. Also, the first audio output unit, the second audio output unit, the first pickup unit, the second pickup unit, and ground are connected by a connecting line. At least a first sound leakage signal, which is the first audio signal leaking into the second signal input line from the first audio output unit via the connecting line and the second pickup unit, is reduced by using the first audio signal, or a second sound leakage signal, which is the second audio signal leaking into the second signal input line from the second audio output unit via the connecting line and the second pickup unit, is reduced by using the second audio signal.

According to an embodiment of the present technology, headphone sound leakage can be further reduced.

DETAILED DESCRIPTION OF EMBODIMENTS

Hereinafter, embodiments to which the present technology has been applied will be explained with reference to the drawings.

First Embodiment

[Production of Sound Leakage and its Reduction]

First, production of sound leakage in headphones with a five-contact connector and the reduction of sound leakage by the present technology will be explained with reference to FIGS. 1 to 4.

Figure 1:
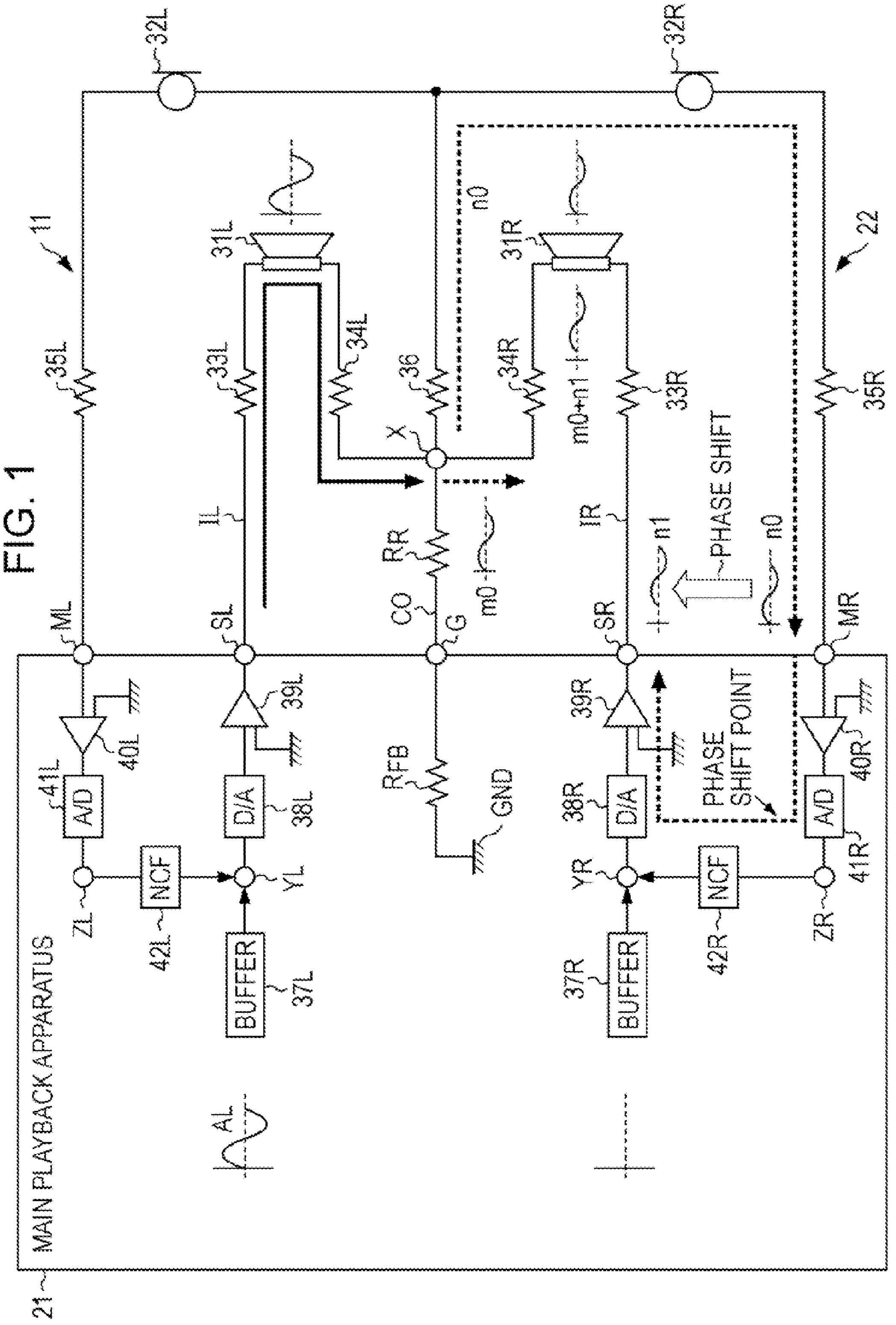
FIG. 1 illustrates production of sound leakage and its reduction.

For example, consider the case where an audio signal is played back in the audio playback apparatus 11 illustrated in FIG. 1. This audio playback apparatus 11 includes a main playback apparatus 21, and headphones 22 connected to the main playback apparatus 21 by a five-contact connector.

The headphones 22 are provided with a left headphone 31L that outputs left-channel audio, a right headphone 31R that outputs right-channel audio, and a left microphone 32L and a right microphone 32R that pick up ambient audio. Particularly, the left microphone 32L is provided near the left headphone 31L, and the right microphone 32R is provided near the right headphone 31R.

Also, the left headphone 31L, the right headphone 31R, the left microphone 32L, and the right microphone 32R are connected to the main playback apparatus 21 by five terminals ML, SL, G, SR, and MR.

Namely, one of the terminals of the left headphone 31L is connected to the terminal SL by an input signal line IL, and a resistance 33L exists on the input signal line IL. Also, the other terminal of the left headphone 31L is connected to the connecting terminal G by a connecting line CO. Specifically, the other terminal of the left headphone 31L is connected to a node X on the connecting line CO by a signal line, and a resistance 34L exists on that signal line. Furthermore, a shared resistance $R_R$ exists between node X on the connecting line CO and the terminal G.

Meanwhile, one of the terminals of the right headphone 31R is connected to the terminal SR by an input signal line IR, and a resistance 33R exists on the input signal line IR. Also, the other terminal of the right headphone 31R is connected to the node X by a signal line, on which a resistance 34R exists.

One of the terminals of the left microphone 32L is connected to the terminal ML by a signal line, on which a resistance 35L exists. One of the terminals of the right microphone 32R is connected to the terminal MR by a signal line, on which a resistance 35R exists. Also, the other terminals of the left microphone 32L and the right microphone 32R are connected to the node X via a resistance 36 which exists on the connecting line CO.

Also, at the main playback apparatus 21, ground G is connected to the terminal G via a resistance $R_{FB}$. Consequently, the left headphone 31L, the right headphone 31R, the left microphone 32L, and the right microphone 32R are connected to a shared ground G by the connecting line CO.

Furthermore, the main playback apparatus 21 is provided with a buffer 37L that temporarily records a left-channel audio signal, and a buffer 37R that temporarily records a right-channel audio signal.

The buffer 37L is connected to the terminal SL via a node YL, and a digital/analog (D/A) converter 38L and amplifier 39L are provided between the node YL and the terminal SL.

Consequently, an audio signal output from the buffer 37L is converted from a digital signal into an analog signal by the D/A converter 38L, amplified by the amplifier 39L, and input into the left headphone 31L via the input signal line IL.

Similarly, the buffer 37R is connected to the terminal SR via a node YR, and a D/A converter 38R and an amplifier 39R are provided between the node YR and the terminal SR. Consequently, an audio signal output from the buffer 37R is converted from a digital signal into an analog signal by the D/A converter 38R, amplified by the amplifier 39R, and input into the right headphone 31R via the input signal line IR.

Furthermore, the main playback apparatus 21 is provided with circuits that realize noise-cancelling functions by causing audio that cancels ambient sounds picked up by the left microphone 32L and the right microphone 32R to be output from the left headphone 31L and the right headphone 31R, respectively. Namely, the main playback apparatus 21 is provided with a circuit including an amplifier 40L, an analog/digital (A/D) converter 41L, and a filter processor 42L, and a circuit including an amplifier 40R, an A/D converter 41R, and a filter processor 42R.

The terminal ML and the A/D converter 41L are connected to the input terminal and the output terminal of the amplifier 40L, respectively, and the A/D converter 41L is connected to the input terminal of the filter processor 42L via a node ZL. Also, the output terminal of the filter processor 42L is connected to the node YL. Consequently, an audio signal of audio picked up by the left microphone 32L is converted from an analog signal to a digital signal by the A/D converter 41L after being amplified by the amplifier 40L, subjected to filter processing by the filter processor 42L, and output to the node YL. Then, at the node YL, the audio signal from the filter processor 42L is added to an audio signal from the buffer 37L and output to the D/A converter 38L.

In the filter processor 42L, filter processing is conducted such that audio in antiphase with audio picked up by the left microphone 32L is output from the left headphone 31L according to a signal supplied from the filter processor 42L to the left headphone 31L via the input signal line IL. A low-pass filter is used for the filter processing, for example.

Similarly, the terminal MR and the A/D converter 41R are connected to the input terminal and the output terminal of the amplifier 40R, respectively, and the A/D converter 41R is connected to the input terminal of the filter processor 42R via a node ZR. Also, the output terminal of the filter processor 42R is connected to the node YR. Likewise in the filter processor 42R, filter processing is conducted such that audio in antiphase with audio picked up by the right microphone 32R is output according to a signal supplied from the filter processor 42R to the right headphone 31R via the input signal line IR.

In the audio playback apparatus 11 herein, a case is described by way of example wherein a portion of the circuits that realize noise-cancelling functions are configured as digital circuits, but it may also be configured such that the circuits which realize noise-cancelling functions are configured entirely as analog circuits. Also, in order to simplify explanation hereinafter, the gain of the amplifiers in the audio playback apparatus 11 is taken to be 1 unless specifically noted.

Consider the case where, in an audio playback apparatus 11 configured as in FIG. 1, the right-channel audio signal to be played back is silent, and the left-channel audio signal is a high-amplitude signal AL.

In this case, the high-amplitude signal AL is read out from the buffer 37L and converted into an analog signal by the D/A converter 38L. Then, the high-amplitude signal AL, now an analog signal, passes through the left headphone 31L from the terminal SL and causes the left headphone 31L to produce a sound wave. After that, the signal reaches the node X connected to ground GND.

Having reached the node X, the high-amplitude signal AL ideally should be entirely fed back to the terminal G, but since the magnitude of the shared resistance $R_R$ between the node X and the terminal G and of the resistance $R_{FB}$ inside the main playback apparatus 21 are not 0, feedback of the high-amplitude signal AL is inhibited. As a result, a partial signal m0 of the high-amplitude signal AL leaks into the right headphone 31R via the node X.

With headphones having a three-contact connector, sound leakage into the right headphone 31R could be reduced by eliminating just the signal m0 that leaked out in this way.

However, with headphones 22 having a five-contact connector, the left microphone 32L and the right microphone 32R are also connected to the node X and the noise-cancelling circuits. For this reason, a partial signal n0 of the high-amplitude signal AL that has passed through the left headphone 31L returns to the main playback apparatus 21 via the right microphone 32R and the terminal MR.

Meanwhile, with noise cancelling of the related art, an external noise signal supplied to the main playback apparatus 21 from the right microphone 32R is converted into a digital signal by the A/D converter 41R and transmitted to the filter processor 42R. Then, the noise signal is converted into a signal for cancelling external noise by the filter processor 42R, added to a right-channel audio signal at the node YR, and transmitted to the right headphone 31R. Then, in the right headphone 31R, actual audio (a sound wave) for cancelling noise is produced according to the input audio signal.

Herein, since noise cancelling itself is already a well-established technology to persons skilled in the art and not the principal idea of the present technology, detailed explanation thereof will be reduced or omitted. Also, in order to simplify explanation with FIG. 1, explanation will proceed assuming that there is no external noise.

Assuming that there is no noise around the audio playback apparatus 11, a signal transmitted to the filter processor 42R will be just the partial signal n0 that leaked into the right microphone 32R from the high-amplitude signal AL. The signal n0 is filtered by the filter processor 42R. A phase shift occurs due to this filter processing, with the signal n0 becoming a signal n1.

In the right headphone 31R, a signal including the signal n1 leaked out from the right microphone 32R and the signal m0 leaked out from the node X into the right headphone 31R produces sound leakage. In other words, the signal n1 and the signal m0 produce sound that normally should not have been produced from the right headphone 31R. In this way, a signal n1 is output from the filter processor 42R even in the case of no external noise, and this signal n1 is undesired under normal circumstances.

Next, consider reducing sound leakage produced by a signal m0 and a signal n1 produced in this way.

Figure 2:
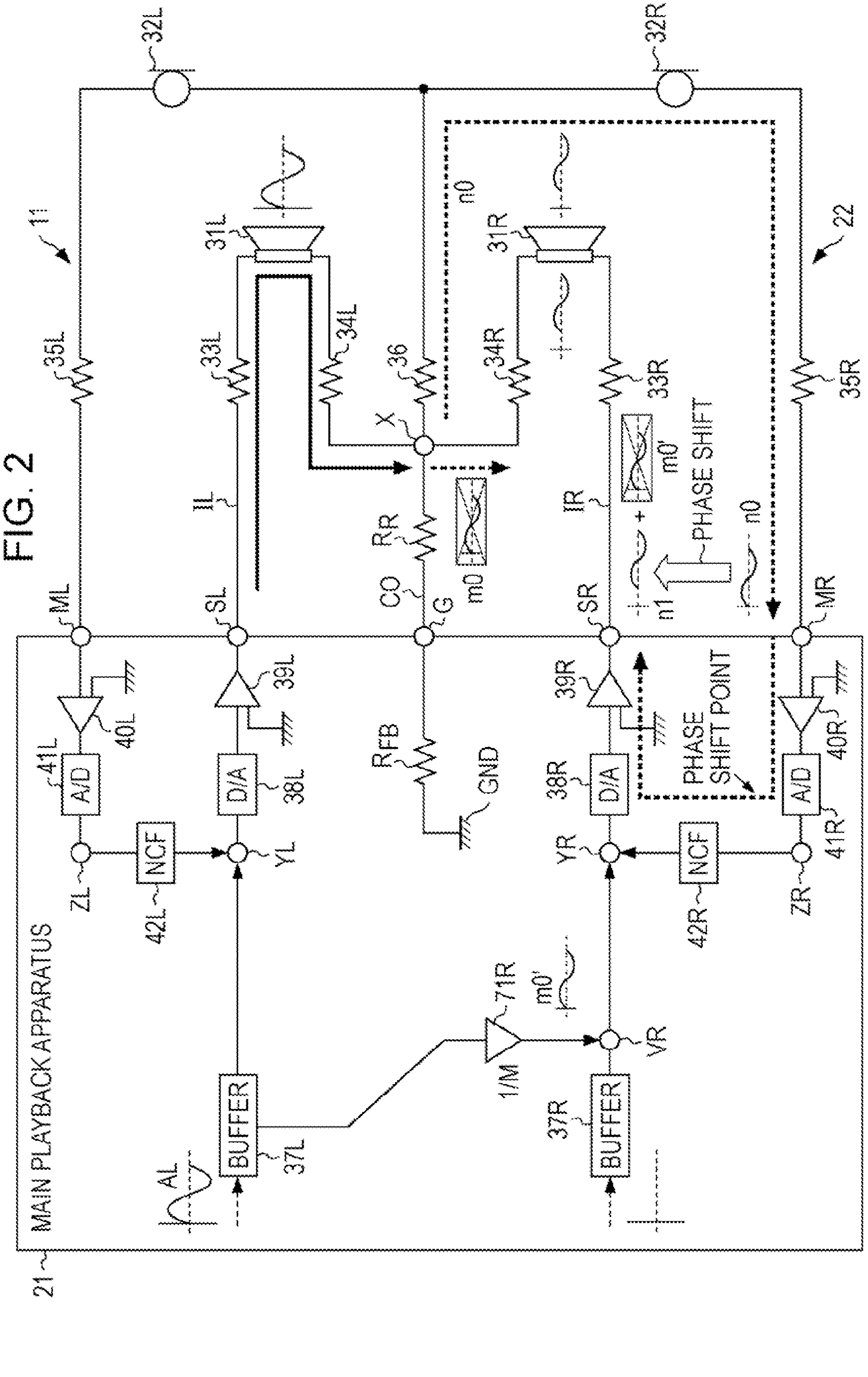
FIG. 2 illustrates production of sound leakage and its reduction.

For example, take a node VR to be provided between the buffer 37R and the node YR in the main playback apparatus 21, and an amplifier 71R to be provided between the buffer 37L and the node VR, as illustrated in FIG. 2. Herein, in FIG. 2, portions corresponding to the case in FIG. 1 are given like reference signs, and explanation thereof is omitted or reduced as appropriate.

The amplifier 71R adjusts the gain of the high-amplitude signal AL to the same magnitude as the signal m0 by multiplying the left-channel audio signal supplied from the buffer 37L, or in other words the high-amplitude signal AL, by a predetermined coefficient 1/M. The signal m0' obtained as a result is output to the node VR. In so doing, the signal m0' is added to the right-channel audio signal output from the buffer 37R at the node VR.

Herein, the coefficient 1/M is a value expressing the ratio of the magnitude of a signal from the terminal SL that reaches the node X via the left headphone 31L versus the magnitude of a partial signal from that signal which leaks into the right headphone 31R from the node X. In other words, the coefficient 1/M is a value expressing the sound leakage ratio of a left-channel audio signal. This coefficient 1/M can be computed in advance from the values of the shared resistance $R_R$ and the resistance 34R, etc.

In the example in FIG. 2, the amplitude of the right-channel audio signal is 0, or in other words silent, and thus in this example the signal supplied from the node VR to the right headphone 31R via the terminal SR becomes the signal m0' only. When this signal m0' is transmitted from the terminal SR to the right headphone 31R, the signal m0 leaking out from the node X into the right headphone 31R and the signal m0' cancel each other out and are annihilated.

In other words, since the signal m0' and the signal m0 are signals of equal phase and equal amplitude, when these signals are supplied to the right headphone 31R from mutually different directions, the potential differential between the terminal of the right headphone 31R on the side of the node X and the terminal on the side of the terminal SR becomes zero. In so doing, current ceases to flow to the right headphone 31R, and sound waves cease to be produced.

When a signal m0' is transmitted from the terminal SR heading towards the right headphone 31R in this way, the signal m0 is cancelled out, but the signal n1 leaking into the right headphone 31R from the left headphone 31L via the right microphone 32R remains. The sound leakage due to this signal n1 is the reason why the sound leakage reduction method which was effectively realized for the case of a three-contact connector becomes unable to sufficiently reduce sound leakage produced with a five-contact connector.

Figure 3:
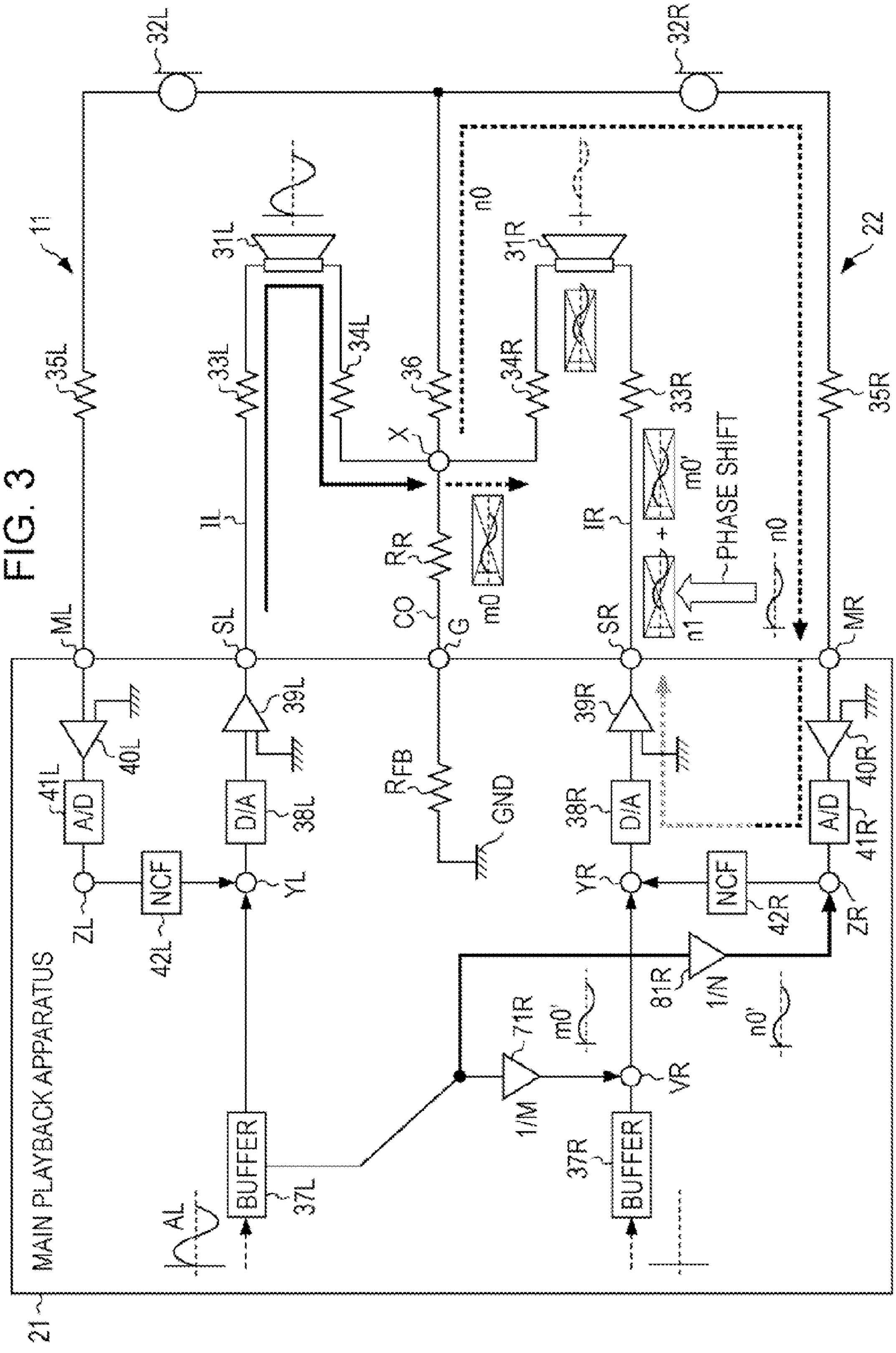
FIG. 3 illustrates production of sound leakage and its reduction.

Thus, in the present technology, by providing an amplifier 81R between the buffer 37L and the node ZR as illustrated in FIG. 3, the signal n0 is cancelled out before the signal n0 becomes the signal n1 in the filter processor 42R. Herein, in FIG. 3, portions corresponding to the case in FIG. 2 are given like reference signs, and explanation thereof is reduced or omitted as appropriate.

The amplifier 81R adjusts the gain of the high-amplitude amplitude signal AL to the same magnitude as the signal n0 by multiplying the left-channel audio signal supplied from the buffer 37L, or in other words the high-amplitude signal AL, by a predetermined coefficient 1/N. The signal n0' obtained as a result is output to the node ZR. In so doing, the signal n0' is added to the signal n0 supplied to the filter processor 42R from the A/D converter 41R at the node ZR.

Herein, the coefficient 1/N is a value expressing the ratio of the magnitude of a signal from the terminal SL that reaches the node X via the left headphone 31L versus the magnitude of a partial signal from that signal which leaks into the right microphone 32R from the node X. In other words, the coefficient 1/N is a value expressing the sound leakage ratio of a left-channel audio signal. This coefficient 1/N can be computed in advance from the values of the shared resistance $R_R$ and the resistance 36R, etc.

In this way, when a signal n0' having the same phase and amplitude as the signal n0 is supplied to the node ZR, the signal n0 leaking out from the left headphone 31L via the right microphone 32R is cancelled out by the signal n0' and annihilated. In other words, by supplying the signal n0', current ceases to flow from the node ZR to the filter processor 42R.

Thus, it is possible to reduce a signal n1 which could not be reduced with a sound leakage reduction method of the related art, and improve the sound quality of audio played back by the right headphone 31R. Particularly, since the signal n0 changes phase in the filter processor 42R to become a signal n1, sound leakage can be reduced more easily by cancelling out this signal n0 with a signal n0' during the stage before the signal n0 changes phase.

Meanwhile, although the case where the amplitude of the right-channel audio signal is 0 was explained in order to simplify explanation in the foregoing, ordinarily it is the case where the amplitude of the right-channel audio signal is not 0. In such cases, the right-channel audio signal also leaks out from the node X into the right microphone 32R as the left-channel audio signal leaks out from the node X to the right microphone 32R.

For example, to explain taking the left channel as an example, the amplitude of the left-channel audio signal is not 0, and a signal n0 also leaks out from the node X into the left microphone 32L, similarly to how a signal n0 leaks out from the node X into the right microphone 32R.

Figure 4:
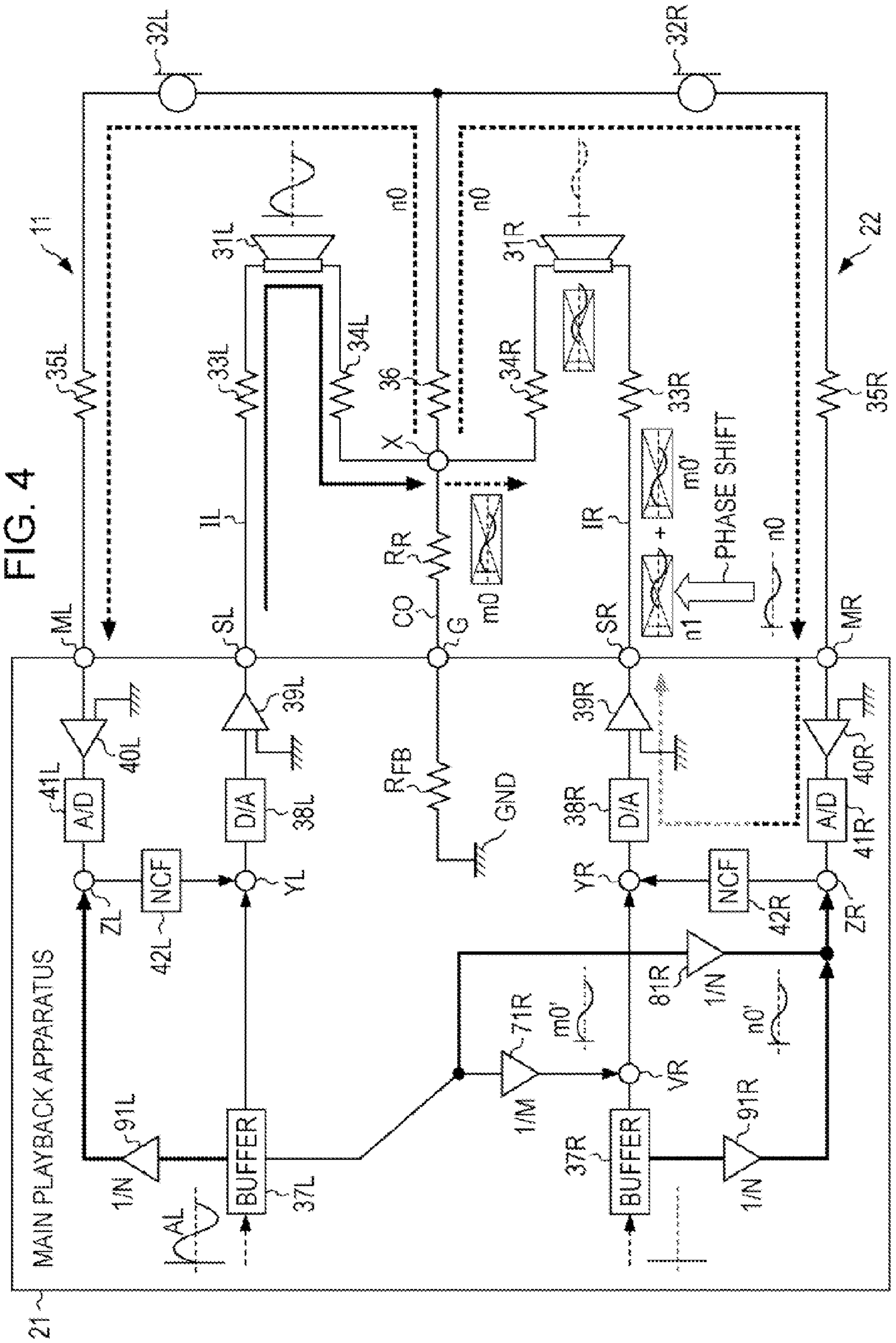
FIG. 4 illustrates production of sound leakage and its reduction.

Thus, in the present technology, by providing an amplifier 91L between the buffer 37L and the node ZL as illustrated in FIG. 4, a signal n0 from the node X that once again returns to the left headphone 31L via the left microphone 32L is cancelled out. Herein, in FIG. 4, portions corresponding to the case in FIG. 3 are given like reference signs, and explanation thereof is reduced or omitted as appropriate.

The amplifier 91L adjusts the gain of the high-amplitude signal AL to the same magnitude as the signal n0 by multiplying the left-channel audio signal supplied from the buffer 37L, or in other words the high-amplitude signal AL, by a predetermined coefficient 1/N. The signal n0' obtained as a result is output to the node ZL. In so doing, the signal n0' is added to the signal n0 supplied to the filter processor 42L from the A/D converter 41L at the node ZL.

Herein, the coefficient 1/N is a value expressing the sound leakage ratio of a left-channel audio signal from the node X into the left microphone 32L, and is the same coefficient as the coefficient 1/N used in the amplifier 81R.

In this way, when a signal n0' having the same phase and amplitude as the signal n0 is supplied to the node ZL, the signal n0 leaking out from the left headphone 31L via the left microphone 32L is cancelled out by the signal n0' and annihilated at the node ZL.

If such an example of a left-channel audio signal returning to the left headphone 31L is applied to the right channel, a right-channel audio signal should be multiplied by the coefficient 1/N and supplied to the node ZR in order to cancel out a signal from the node X that leaks into the terminal MR via the right microphone 32R.

In other words, an amplifier 91R corresponding to the amplifier 91L should be provided between the buffer 37R and the node ZR. The amplifier 91R multiplies a right-channel audio signal supplied from the buffer 37R by a predetermined coefficient 1/N, and outputs the signal obtained as a result to the node ZR. In so doing, the signal from the amplifier 91R is added to the signal supplied to the filter processor 42R from the A/D converter 41R at the node ZR.

Herein, this coefficient 1/N is a value expressing the sound leakage ratio of a right-channel audio signal from the node X into the right microphone 32R, and is the same coefficient as the coefficient 1/N used in the amplifier 91L.

As above, if an amplifier 81R and an amplifier 91R are provided in a main playback apparatus 21, sound leakage into the right headphone 31R can be reduced and the sound quality of played back audio can be improved. Furthermore, although a mechanism for reducing sound leakage into the right headphone 31R was explained in the foregoing, it is possible to also reduce sound leakage into the left headphone 31L by providing a mechanism similar to that of the right headphone 31R.

[Configuration of Audio Playback Apparatus]

Figure 5:
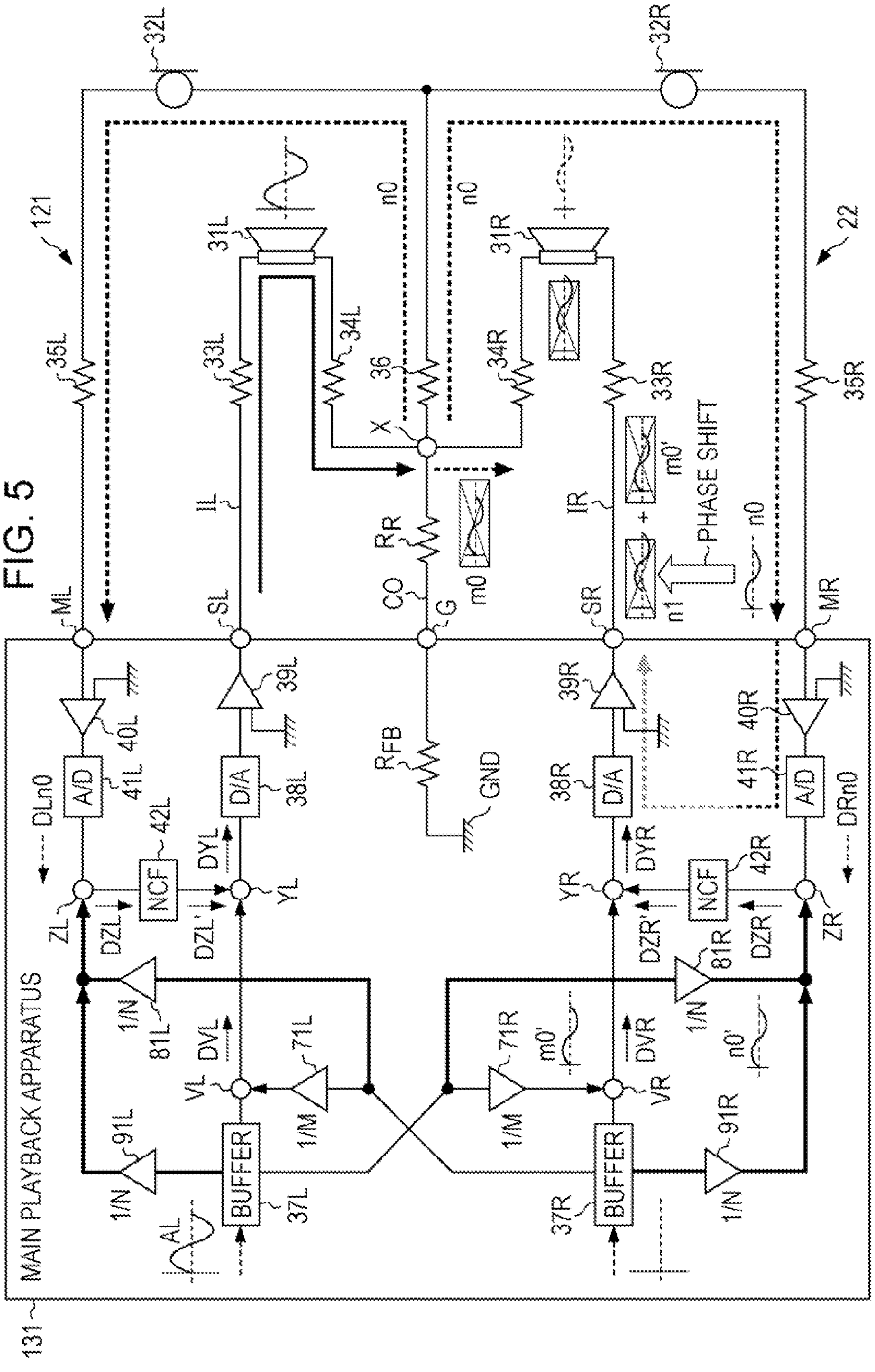
FIG. 5 illustrates an exemplary configuration of an embodiment of an audio playback apparatus to which the present technology has been applied.

Next, an audio playback apparatus that reduces sound leakage with the techniques explained above will be explained. FIG. 5 is a diagram illustrating an exemplary configuration of an embodiment of an audio playback apparatus to which the present technology has been applied. Herein, in FIG. 5, portions corresponding to the cases in FIGS. 1 to 4 are given like reference signs, and explanation thereof is reduced or omitted as appropriate.

The audio playback apparatus 121 in FIG. 5 is composed of five-contact connector headphones 22 and a main playback apparatus 131, with the headphones 22 being connected to the main playback apparatus 131 by five terminals ML, SL, G, SR, and MR.

The main playback apparatus 131 is configured as the main playback apparatus 21 in FIG. 1, additionally provided with an amplifier 71L, an amplifier 71R, an amplifier 81L, an amplifier 81R, an amplifier 91L, and an amplifier 91R.

The amplifier 71L and the amplifier 71R multiply an audio signal supplied from the buffer 37R and the buffer 37L by a coefficient 1/M, and supply an audio signal attenuated by multiplication with the coefficient 1/M to a node VL and a node VR. In the main playback apparatus 131, the node VL is provided between the buffer 37L and the node YL, and the node VR is provided between the buffer 37R and the node YR.

Also, the amplifier 81L and the amplifier 81R multiply an audio signal supplied from the buffer 37R and the buffer 37L by a coefficient 1/N, and supply an audio signal attenuated by multiplication with the coefficient 1/N to a node ZL and a node ZR. The amplifier 91L and the amplifier 91R multiply an audio signal supplied from the buffer 37L and the buffer 37R by a coefficient 1/N, and supply an audio signal attenuated by multiplication with the coefficient 1/N to the node ZL and the node ZR.

[Explanation of Audio Playback Process]

If the audio playback apparatus 121 illustrated in FIG. 5 is operated by a user and instructed to play back audio, the audio playback apparatus 121 conducts an audio playback process and plays back specified audio. Hereinafter, an audio playback process by the audio playback apparatus 121 will be explained with reference to the flowchart in FIG. 6. Hereinafter, explanation will proceed taking the audio signal of the audio played back by the audio playback apparatus 121 to be particularly a music signal that plays back a song.

In a step S11, the buffer 37L and the buffer 37R receive input of a music signal for playback. Thereupon, the main playback apparatus 131 supplies the music signal specified by the user to the buffer 37L and the buffer 37R and causes it to be temporarily recorded. For example, a digital signal DL, being a left-channel music signal, is supplied to the buffer 37L, and a digital signal DR, being a right-channel music signal, is supplied to the buffer 37R.

In a step S12, the amplifier 71L and the amplifier 71R read out a predetermined coefficient 1/M from memory not illustrated.

Then, in a step S13, a multiply-accumulate operation is conducted at the node VL and the node VR.

In other words, the amplifier 71L reads out the digital signal DR from the buffer 37R, multiplies it by the coefficient 1/M, and supplies the signal obtained thereby to the node VL. Also, the buffer 37L supplies the recorded digital signal DL to the node VL. In so doing, the digital signal DR that has been multiplied by the coefficient 1/M is added to the digital signal DL at the node VL, and a signal DVL expressed in the following Eq. 1 is output from the node VL to the node YL.

$$DVL=DL+DR\times(1/M) \quad (1)$$

Herein, in Eq. 1, DL and DR indicate the digital signal DL and the digital signal DR. In this way, by adding a gain-adjusted digital signal DR to the digital signal DL, a digital signal DR leaking out from the right headphone 31R into the left headphone 31L via the node X can be cancelled out.

Also, the amplifier 71R reads out the digital signal DL from the buffer 37L, multiplies it by the coefficient 1/M, and supplies the signal obtained thereby to the node VR. The buffer 37R supplies the recorded digital signal DR to the node VR. In so doing, the digital signal DL that has been multiplied by the coefficient 1/M is added to the digital signal DR at the node VL, and a signal DVR expressed in the following Eq. 2 is output from the node VR to the node YR.

$$DVR=DR+DL\times(1/M) \quad (2)$$

In this way, by adding a gain-adjusted digital signal DL to the digital signal DR, a digital signal DL leaking out from the left headphone 31L into the right headphone 31R via the node X can be cancelled out.

In a step S14, the main playback apparatus 131 receives input of a digital signal DLn0 from the left microphone 32L and a digital signal DRn0 from the right microphone 32R.

In other words, the left microphone 32L picks up ambient audio and supplies the signal obtained as a result to the A/D converter 41L via the terminal ML and the amplifier 40L. The A/D converter 41L converts the signal supplied from the left microphone 32L from an analog signal into a digital signal, and supplies the digital signal DLn0 obtained as a result to the node ZL.

Similarly, the right microphone 32R picks up ambient audio and supplies the signal obtained as a result to the A/D converter 41R via the terminal MR and the amplifier 40R. The A/D converter 41R converts the signal supplied from the right microphone 32R from an analog signal into a digital signal, and supplies the digital signal DRn0 obtained as a result to the node ZR.

In a step S15, the amplifier 81L, the amplifier 81R, the amplifier 91L, and the amplifier 91R read out a predetermined coefficient 1/N from memory not illustrated.

Then, in a step S16, a multiply-accumulate operation is conducted at the node ZL and the node ZR.

In other words, the amplifier 81L reads out the digital signal DR from the buffer 37R, multiplies it by the coefficient 1/N, and supplies the signal obtained thereby to the node ZL. Also, the amplifier 91L reads out the digital signal DL from the buffer 37L, multiplies it by the coefficient 1/N, and supplies the signal obtained thereby to the node ZL. In so doing, the multiply-accumulate operation expressed in the following Eq. 3 is conducted at the node ZL, and the signal DZL obtained as a result is supplied to the filter processor 42L.

$$DZL=DLn0+((1/N)\times DL)+((1/N)\times DR) \quad (3)$$

In other words, the digital signal DR multiplied by the coefficient 1/N and supplied from the amplifier 81L and the digital signal DL multiplied by the coefficient 1/N and supplied from the amplifier 91L are added to the digital signal DLn0 from the A/D converter 41L at the node ZL, yielding the signal DZL.

In this way, by adding a gain-adjusted digital signal DR to the digital signal DLn0, a digital signal DR that returns to the terminal ML from the node X via the left microphone 32L after passing through the right headphone 31R can be cancelled out. Also, by adding a gain-adjusted digital signal DL to the digital signal DLn0, a digital signal DL that returns to the terminal ML from the node X via the left microphone 32L after passing through the left headphone 31L can be cancelled out.

Furthermore, the amplifier 81R reads out the digital signal DL from the buffer 37L, multiplies it by the coefficient 1/N, and supplies the signal obtained thereby to the node ZR. Also, the amplifier 91R reads out the digital signal DR from the buffer 37R, multiplies it by the coefficient 1/N, and supplies the signal obtained thereby to the node ZR. In so doing, the computation expressed in the following Eq. 4 is conducted at the node ZR, and the signal DZR obtained as a result is supplied to the filter processor 42R.

$$DZR=DRn0+((1/N)\times DR)+((1/N)\times DL) \quad (4)$$

In other words, the digital signal DL multiplied by the coefficient 1/N and supplied from the amplifier 81R and the digital signal DR multiplied by the coefficient 1/N and supplied from the amplifier 91R are added to the digital signal DRn0 from the A/D converter 41R at the node ZR, yielding the signal DZR.

In this way, by adding a gain-adjusted digital signal DR to the digital signal DRn0, a digital signal DL that returns to the terminal MR from the node X via the right microphone 32R after passing through the left headphone 31L can be cancelled out. Also, by adding a gain-adjusted digital signal DR to the digital signal DRn0, a digital signal DR that returns to the terminal MR from the node X via the right microphone 32R after passing through the right headphone 31R can be cancelled out.

Herein, it is explained that the same coefficient 1/N is used by the amplifier 81L and the amplifier 91L, and by the amplifier 81R and the amplifier 91R. However, in the case where the sound leakage ratios differ, different coefficients may also be used by the amplifier 81L and the amplifier 91L, and by the amplifier 81R and the amplifier 91R. Similarly, different coefficients may also be used by the amplifier 71L and the amplifier 71R.

In a step S17, the filter processor 42L and the filter processor 42R conduct filter processing using a low-pass filter, etc.

In other words, the filter processor 42L conducts filter processing on the signal DZL supplied from the node ZL, and supplies the signal DZL' obtained as a result to the node YL. Also, the filter processor 42R conducts filter processing on the signal DZR supplied from the node ZR, and supplies the signal DZR' obtained as a result to the node YR.

If audio is produced by the left headphone 31L and the right headphone 31R on the basis of the signal DZL' and the signal DZR' obtained in this way, the produced audio becomes audio that cancels out the audio picked up by the left microphone 32L and the right microphone 32R. In other words, noise cancelling is realized.

In a step S18, an add operation is conducted at the node YL and the node YR. In other words, the signal DZL' from the filter processor 42L is added to the signal DVL from the node VL at the node YL, and the digital signal DYL obtained as a result is supplied to the D/A converter 38L. Also, the signal DZR' from the filter processor 42R is added to the signal DVR from the node VR at the node YR, and the digital signal DYR obtained as a result is supplied to the D/A converter 38R.

In a step S19, the D/A converter 38L and the D/A converter 38R convert the digital signal DYL and the digital signal DYR input from the node YL and the node YR into analog signals and output.

The signal output from the D/A converter 38L is supplied to the left headphone 31L via the terminal SL, and the left headphone 31L outputs audio on the basis of the signal supplied from the terminal SL. Also, the signal output from the D/A converter 38R is supplied to the right headphone 31R via the terminal SR, and the right headphone 31R outputs audio on the basis of the signal supplied from the terminal SR.

In a step S20, the main playback apparatus 131 determines whether or not to end playback of an audio signal. For example, it is determined to end playback in the case where ending playback is instructed by the user, or in the case where all specified music signals have been played back, etc.

In the case where it is determined not to end playback in step S20, the process returns to step S11, and the process discussed above is repeated. In contrast, in the case where it is determined to end playback in step S20, the audio playback process ends.

In so doing, the audio playback apparatus 121 adds a gain-adjusted digital signal DL and a digital signal DR to signals picked up and obtained by the left microphone 32L and the right microphone 32R. Thus, a partial signal that leaks out via the left microphone 32L or right microphone 32R from a music signal for playback can be cancelled out, and sound leakage in the headphones 22 can be further reduced.

In this way, according to an audio playback apparatus 121, not only sound leakage from the headphone for one channel into the headphone for the other channel, but also sound leakage from noise-cancelling circuits can be reduced. Consequently, the sound quality of played back audio can be improved.

Second Embodiment

[Configuration of Audio Playback Apparatus]

Meanwhile, although a technique for reducing a music signal for playback that leaks out from noise-cancelling circuits is explained in the foregoing, sound leakage of a signal for audio picked up by the left microphone 32L or the right microphone 32R also occurs in the audio playback apparatus 121.

Thus, it may also be configured such that a signal that reduces sound leakage of a signal for audio picked up by the left microphone 32L or the right microphone 32R is added to a left-/right-channel music signal. In such cases, an audio playback apparatus may take the configuration illustrated in FIG. 7, for example. Herein, in FIG. 7, portions corresponding to the case in FIG. 5 are given like reference signs, and explanation thereof is omitted or reduced as appropriate.

Figure 7:
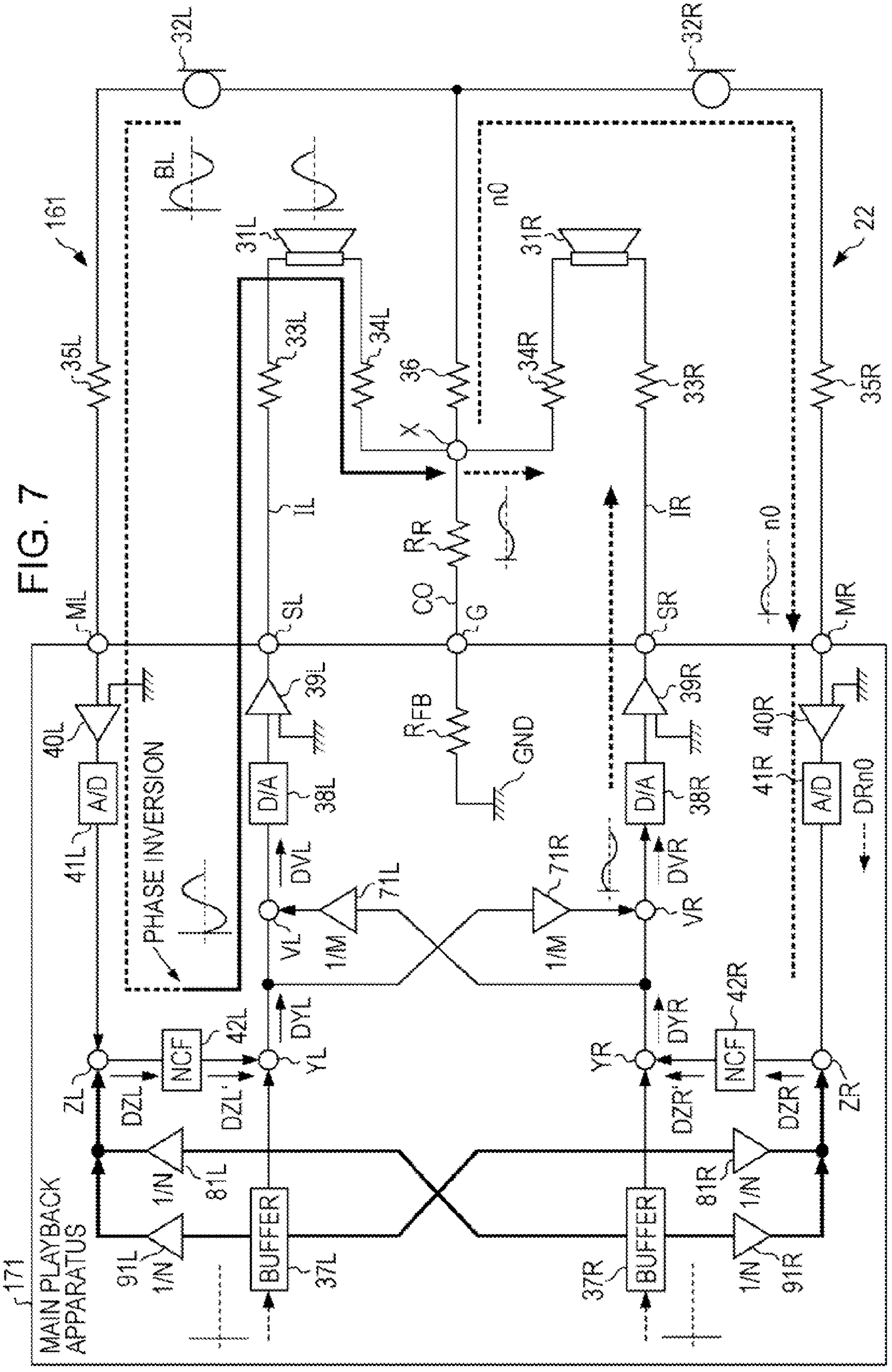
FIG. 7 illustrates another exemplary configuration of an audio playback apparatus.

The audio playback apparatus 161 in FIG. 7 is composed of five-contact connector headphones 22 and a main playback apparatus 171, with the headphones 22 being connected to the main playback apparatus 171 by five terminals ML, SL, G, SR, and MR.

The main playback apparatus 171 and the main playback apparatus 131 in FIG. 5 differ only in the disposed positions of the amplifier 71L and the amplifier 71R, and otherwise may have the same configuration.

Namely, in the main playback apparatus 171 in FIG. 7, the input terminal of the amplifier 71L is connected between the node YR and the D/A converter 38R, while the output terminal of the amplifier 71L is connected between the node YL and the D/A converter 38L. For this reason, the node VL to which the output terminal of the amplifier 71L is connected is positioned between the node YL and the D/A converter 38L.

Similarly, in the main playback apparatus 171, the input terminal of the amplifier 71R is connected between the node YL and the D/A converter 38L, while the output terminal of the amplifier 71R is connected between the node YR and the D/A converter 38R. For this reason, the node VR to which is connected the output terminal of the amplifier 71R is positioned between the node YR and the D/A converter 38R.

Herein, the node VL is positioned closer to the D/A converter 38L than the connection point for the input terminal of the amplifier 71R, and the node VR is positioned closer to the D/A converter 38R than the connection point for the input terminal of the amplifier 71L.

Meanwhile, assume that the amplitude of a music signal supplied to the buffer 37L and the buffer 37R is 0, and that a noise signal BL is obtained by sound pickup by the left microphone 32L, as illustrated in FIG. 7.

This noise signal BL is converted into a digital signal by the A/D converter 41L, and is additionally processed into a noise-cancelling signal by the filter processor 42L after passing through the node ZL. Then, the noise-cancelling signal is converted into an analog signal by the D/A converter 38L and played back by the left headphone 31L via the terminal SL. Thus, audio in antiphase with the audio of the noise signal BL is emitted from the left headphone 31L and noise is cancelled out, and noise cancelling is realized.

In this example, the amplitude of a music signal was taken to be "0", but with regards to audio being output from the left headphone 31L as a result of some kind of signal flowing into the left headphone 31L, the case of playing back a noise-cancelling signal is the same, even in the case of playing back a music signal.

For this reason, a noise-cancelling signal played back by the left headphone 31L will leak out into the right headphone 31R via the node X, similarly to a music signal, and audio that is undesired normally will be produced from the right headphone 31R.

However, since the principle of sound leakage of a noise-cancelling signal is the same as the case of a music signal leaking, it is possible to reduce sound leakage of a noise-cancelling signal similarly to that of a music signal.

In practice, however, since the left microphone 32L is provided positioned on the outside of the user's left ear and the left headphone 31L is worn on the user's left ear so as to occupy the ear, noise perceived by the user's left ear differs from noise picked up by the left microphone 32L.

For this reason, more specifically a noise-cancelling signal is generated by the filter processor 42L such that audio that cancels out the noise actually perceived by the user's left ear is played back, but hereinafter explanation will proceed as though the noise that reaches the user's ear is not attenuated. In other words, explanation will proceed as though the noise picked up by the left microphone 32L and the noise that reaches the user's left ear are the same. Furthermore, this is also similar for the filter processor 42R and not just the filter processor 42L.

In FIG. 5, since only sound leakage of a music signal is targeted, the music signal for one of the channels was gain-adjusted by a coefficient 1/M and added to the music signal for the other channel before a noise-cancelling signal is added to the music signal for one of the channels. In other words, the input terminals of the amplifier 71L and the amplifier 71R were connected to the buffer 37R and the buffer 37L.

In contrast, in the main playback apparatus 171, a music signal for one channel is gain-adjusted by a coefficient 1/M and added to the music signal for the other channel after a noise-cancelling signal is added to the music signal for the one channel.

Consequently, a left-channel noise-cancelling signal is gain-adjusted and added to a right-channel music signal, for example. For this reason, a left-channel noise-cancelling signal that leaks out from the left headphone 31L into the right headphone 31R via the node X is cancelled out by a gain-adjusted noise-cancelling signal that has been added to the right-channel music signal. Thus, sound leakage of a noise-cancelling signal can be reduced in the right headphone 31R. Similarly, sound leakage of a noise-cancelling signal can also be reduced in the left headphone 31L.

[Explanation of Audio Playback Process]

Figure 8:
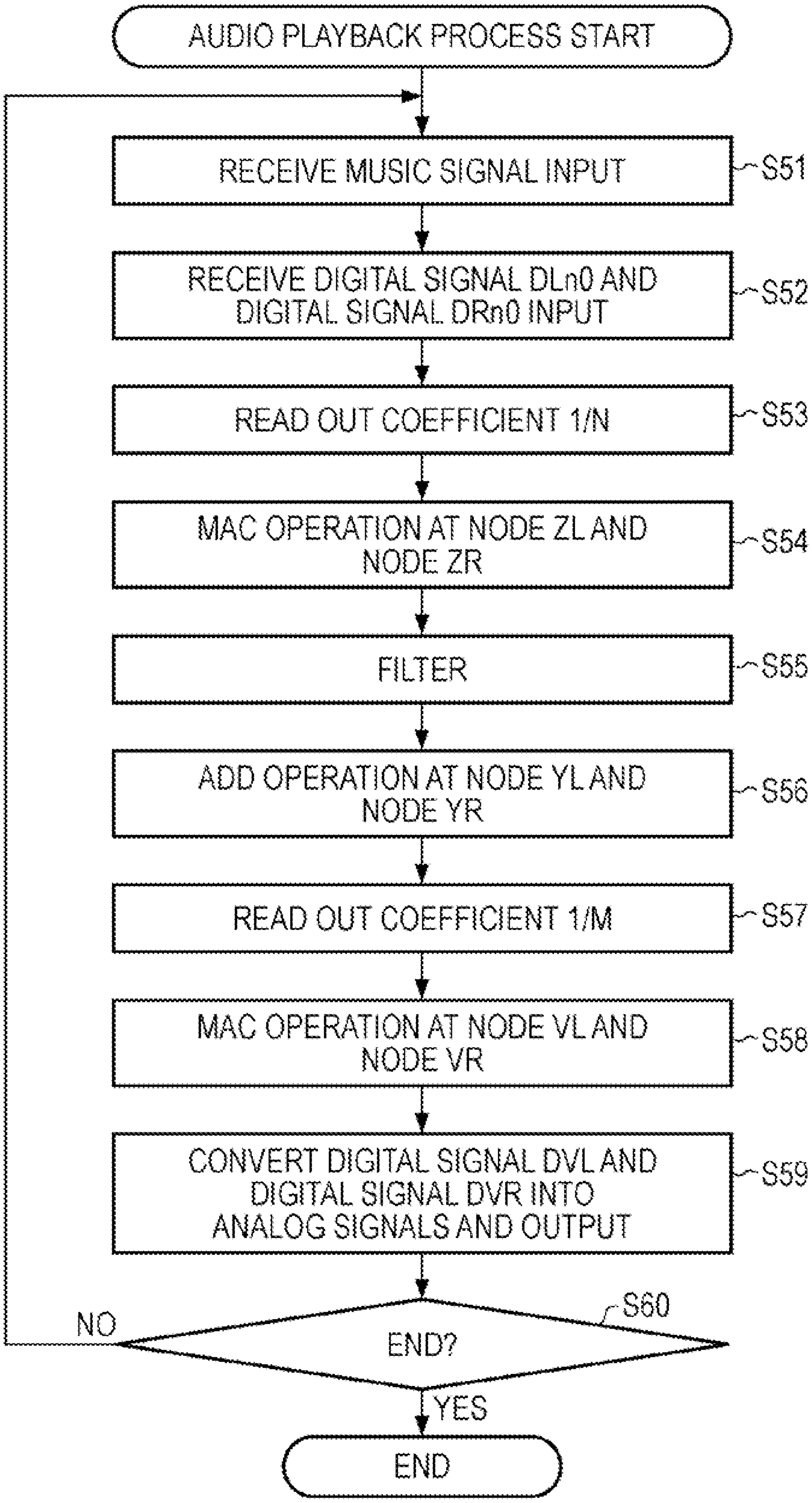
FIG. 8 is a flowchart explaining an audio playback process.

Next, an audio playback process conducted by the audio playback apparatus 161 in FIG. 7 will be explained with reference to the flowchart in FIG. 8. Herein, since the processing in step S51 is similar to the processing in step S11 of FIG. 6, explanation thereof is omitted.

In a step S52, the main playback apparatus 171 receives input of a digital signal DLn0 from the left microphone 32L and a digital signal DRn0 from the right microphone 32R.

In other words, the left microphone 32L picks up ambient audio, and supplies the signal obtained as a result to the A/D converter 41L via the terminal ML and the amplifier 40L. The A/D converter 41L converts the signal supplied from the left microphone 32L into a digital signal DLn0 and supplies it to the node ZL.

Similarly, the right microphone 32R picks up ambient audio, and supplies the signal obtained as a result to the A/D converter 41R via the terminal MR and the amplifier 40R. The A/D converter 41R converts the signal supplied from the right microphone 32R into a digital signal DRn0 and supplies it to the node ZR.

In a step S53, the amplifier 81L, the amplifier 81R, the amplifier 91L, and the amplifier 91R read out a predetermined coefficient 1/N from memory not illustrated.

Figure 6:
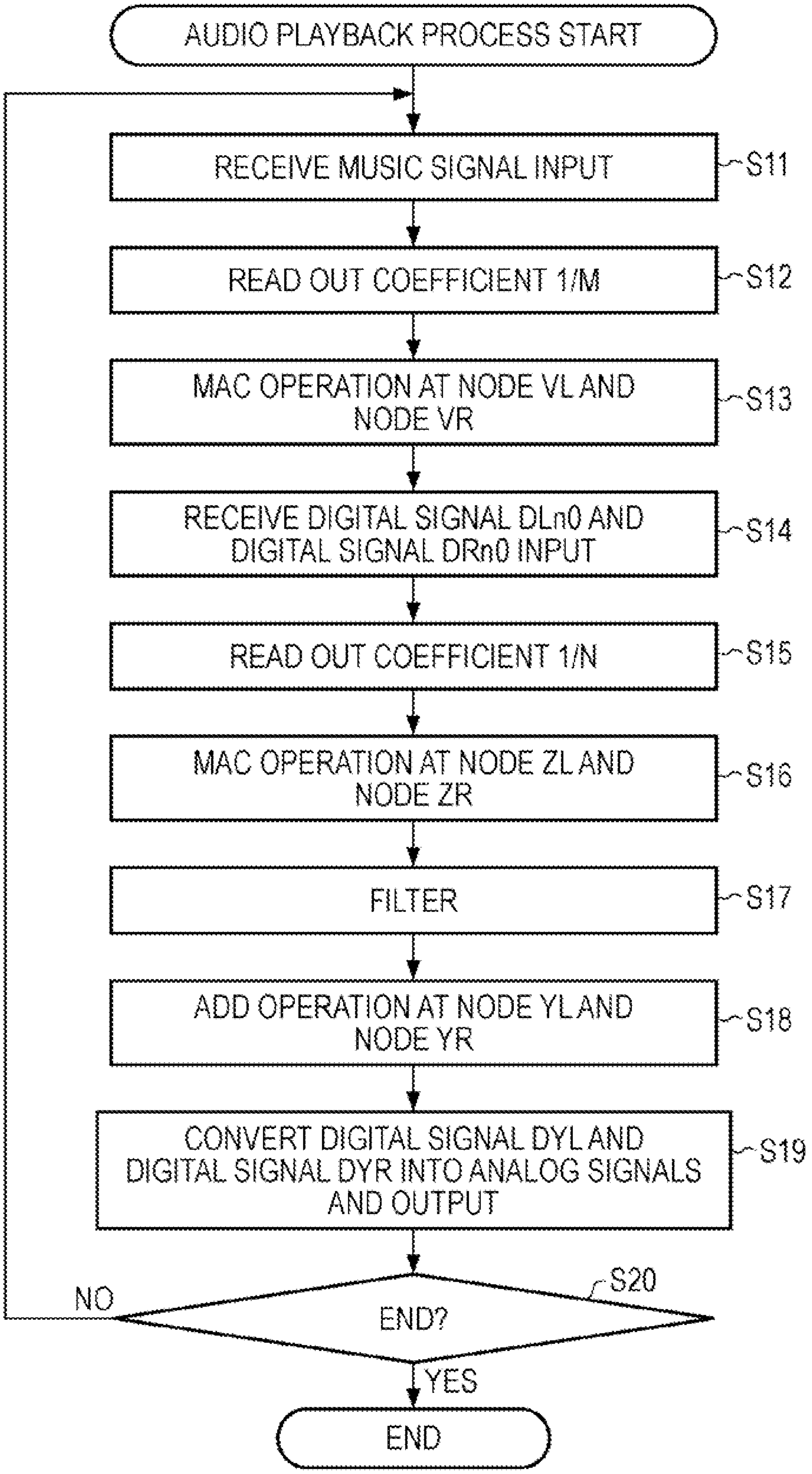
FIG. 6 is a flowchart explaining an audio playback process.

Then, in a step S54, a multiply-accumulate operation is conducted at the node ZL and the node ZR. In other words, in step S54, processing similar to the processing in step S16 of FIG. 6 is conducted. In so doing, a signal DZL obtained by the operation in Eq. 3 discussed earlier is supplied to the filter processor 42L from the node ZL, while a signal DZR obtained by the operation in Eq. 4 is supplied to the filter processor 42R from the node ZR.

In a step S55, the filter processor 42L and the filter processor 42R conduct filter processing using a low-pass filter, etc.

In other words, the filter processor 42L conducts filter processing on the signal DZL supplied from the node ZL, and supplies the signal DZL' obtained as a result to the node YL. Also, the filter processor 42R conducts filter processing on the signal DZR supplied from the node ZR, and supplies the signal DZR' obtained as a result to the node YR.

In a step S56, an add operation is conducted at the node YL and the node YR.

In other words, the signal DZL' from the filter processor 42L is added to the left-channel music signal read out from the buffer 37L at the node YL, and the digital signal DYL obtained as a result is supplied to the node VL and the amplifier 71R. Also, the signal DZR' from the filter processor 42R is added to the right-channel music signal read out from the buffer 37R at the node YR, and the digital signal DYR obtained as a result is supplied to the node VR and the amplifier 71L.

In a step S57, the amplifier 71L and the amplifier 71R read out a predetermined coefficient 1/M from memory not illustrated.

Then, in a step S58, a multiply-accumulate operation is conducted at the node VL and the node VR.

In other words, the amplifier 71L multiplies the digital signal DYR supplied from the node YR by the coefficient 1/M, and supplies the signal obtained thereby to the node VL. In so doing, a digital signal DYR multiplied by the coefficient 1/M is added to the digital signal DYL from the node YL at the node VL, and the signal DVL expressed in the following Eq. 5 is output to the D/A converter 38L from the node VL.

$$DVL=DYL+DYR\times(1/M) \quad (5)$$

Herein, in Eq. 5, DYL and DYR represent the digital signal DYL and the digital signal DYR. In this way, the main playback apparatus 171 adds a digital signal DYR that includes a noise-cancelling signal generated from audio picked up by the right microphone 32R to a gain-adjusted signal DYL. In so doing, a noise-cancelling signal that leaks into the left headphone 31L from the right headphone 31R via the node X can be cancelled out.

Also, the amplifier 71R multiplies the digital signal DYL supplied from the node YL by the coefficient 1/M, and supplies the signal obtained thereby to the node VR. In so doing, a digital signal DYL multiplied by the coefficient 1/M is added to the digital signal DYR from the node YR at the node VR, and the signal DVR expressed in the following Eq. 6 is output to the D/A converter 38R from the node VR.

$$DVR=DYR+DYL\times(1/M) \quad (6)$$

In this way, the main playback apparatus 171 adds a digital signal DYL that includes a noise-cancelling signal generated from audio picked up by the left microphone 32L to a gain-adjusted signal DYR. In so doing, a noise-cancelling signal that leaks into the right headphone 31R from the left headphone 31L via the node X can be cancelled out.

Once the processing in step S58 is conducted, after that the processing in a step S59 and a step S60 are conducted and the audio playback process ends, but since this processing is similar to the processing in step S19 and step S20 of FIG. 6, explanation thereof is omitted or reduced. However, in step S59, the signal DVL and the signal DVR are converted into analog signals by the D/A converter 38L and the D/A converter 38R, and supplied to the left headphone 31L and the right headphone 31R.

In so doing, the audio playback apparatus 161 adds a music for one channel, to which has been added a noise-cancelling signal and which additionally has been gain-adjusted, to a music signal for the other channel. In so doing, a noise-cancelling signal leaking into the headphone for the other channel from the headphone for the one channel can be cancelled out, and sound leakage in the headphones 22 can be further reduced.

In this way, according to an audio playback apparatus 161, a music signal and a noise-cancelling signal leaking into the headphone for another channel from the headphone for one channel can be reduced, and furthermore sound leakage from a noise-cancelling circuit can also be reduced. Consequently, the sound quality of played back audio can be improved, and in addition noise-cancelling performance can also be improved.

<Modification>

[Configuration of Audio Playback Apparatus]

Herein, the main playback apparatus 171 in FIG. 7 is configured such that after left-/right-channel music signals are read out, the signals are respectively and individually gain-adjusted and input into the node ZL and the node ZR, with the coefficient 1/N used for gain adjustment of these music signals all being the same value. Thus, in order to eliminate the number of parts in the main playback apparatus 171, it may also be configured such that after the left-/right-channel music signals are monauralized, the monauralized signal is gain-adjusted using a coefficient 1/N and input into the node ZL and the node ZR.

Figure 9:
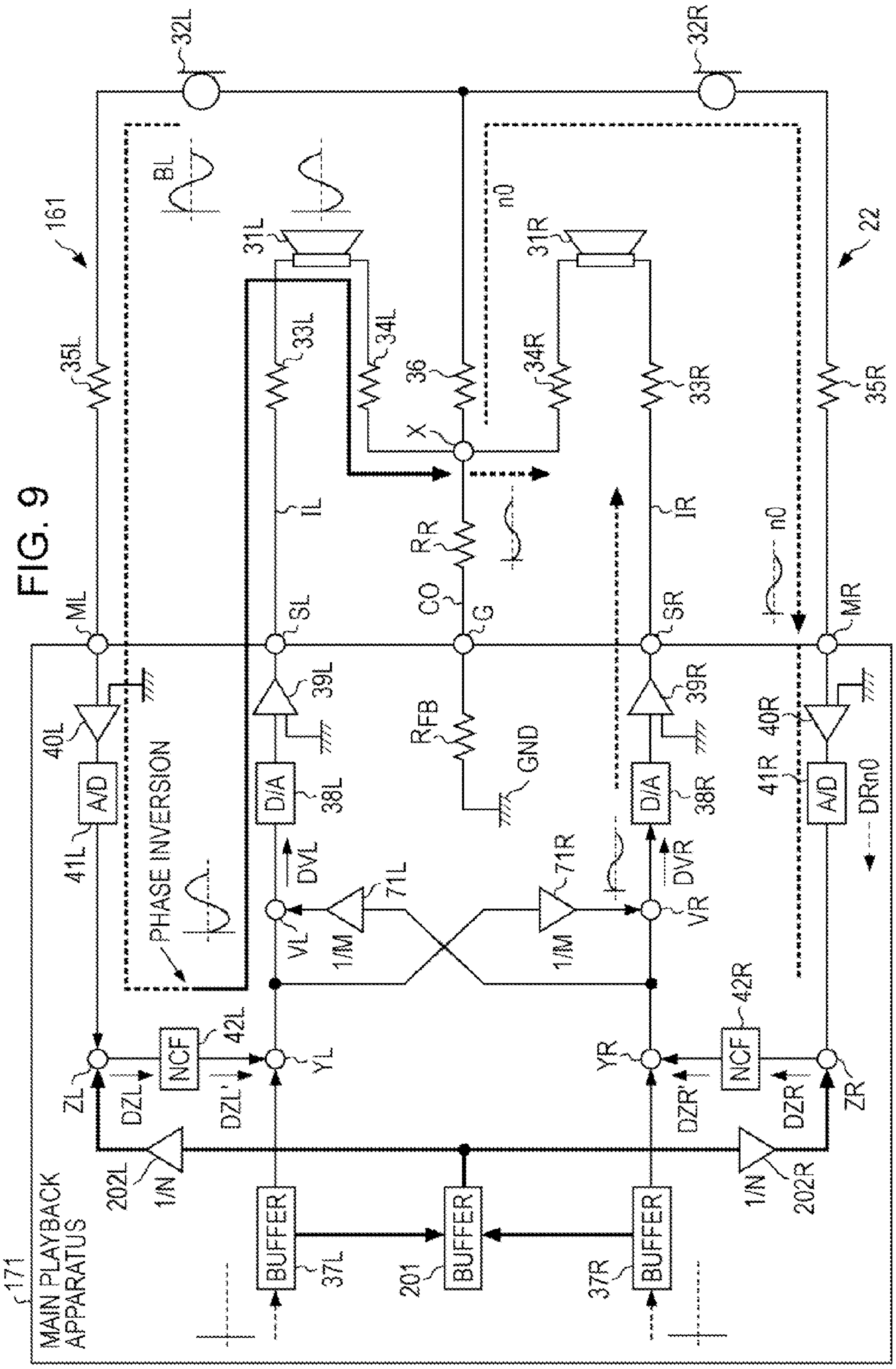
FIG. 9 illustrates another exemplary configuration of an audio playback apparatus.

In such cases, the audio playback apparatus 161 takes the configuration illustrated in FIG. 9, for example. Herein, in FIG. 9, portions corresponding to the case in FIG. 7 are given like reference signs, and explanation thereof is omitted or reduced as appropriate.

The audio playback apparatus 161 in FIG. 9 differs from the audio playback apparatus 161 in FIG. 7 in that an amplifier 202L and an amplifier 202R are provided instead of the amplifier 81L, the amplifier 81R, the amplifier 91L, and the amplifier 91R, and otherwise has the same configuration as the audio playback apparatus 161 in FIG. 7.

In the main playback apparatus 171 in FIG. 9, a left-channel music signal read out from the buffer 37L and a right-channel signal read out from the buffer 37R are supplied to a buffer 201. The buffer 201 monauralizes the music signal by adding together the music signal from the buffer 37L and the music signal from the buffer 37R, and the music signal obtained as a result is supplied to the amplifier 202L and the amplifier 202R.

The amplifier 202L and the amplifier 202R conduct the same operation as the amplifier 81L and the amplifier 81R in FIG. 7. In other words, the amplifier 202L conducts gain adjustment of the music signal by multiplying the music signal supplied from the buffer 201 by a predetermined coefficient 1/N, and supplies a music signal multiplied by the coefficient 1/N to the node ZL. Also, the amplifier 202R conducts gain adjustment of the music signal by multiplying the music signal supplied from the buffer 201 by a predetermined coefficient 1/N, and supplies a music signal multiplied by the coefficient 1/N to the node ZR.

Consequently, left-/right-channel music signals multiplied by a coefficient 1/N are ultimately supplied to the node ZL and the node ZR, respectively. In the audio playback apparatus 161 in FIG. 9, the same advantages as the case of the audio playback apparatus 161 in FIG. 7 are obtained.

In this way, according to the audio playback apparatus 161 in FIG. 9, the number of parts constituting the main playback apparatus 171 can be reduced, and size reduction of the audio playback apparatus 161 can be attempted.

Furthermore, since left-/right-channel music signals that have been gain-adjusted by the same coefficient 1/N are input into the node ZL and the node ZR in the audio playback apparatus 121 in FIG. 5 as well, it may also be configured such that those music signals are added together and then gain-adjusted similarly to the case in FIG. 9.

Also, in the foregoing, a case where part of the audio playback apparatus 121 and the audio playback apparatus 161 was configured as a digital circuit was described in order to simplify explanation, but the audio playback apparatus 121 and the audio playback apparatus 161 may also be entirely configured as analog circuits. However, since attempting to configure an audio playback apparatus with analog circuits increases the number of parts, the number of parts and cost can be reduced by realizing an audio playback apparatus using digital circuits.

Herein, an embodiment of the present technology is not limited to the embodiments discussed above, and various modifications are possible within a scope that does not depart from the principal matter of the present technology.

The present disclosure contains subject matter related to that disclosed in Japanese Priority Patent Application JP 2010-196646 filed in the Japan Patent Office on Sep. 2, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus, comprising:

a first audio output unit configured to output audio based on a first audio signal input from a first signal input line;

a first pickup unit, connected to the first signal input line, and configured to pick up ambient audio;

a second audio output unit configured to output audio based on a second audio signal input from a second signal input line;

a second pickup unit, connected to the second signal input line, and configured to pick up the ambient audio;

a connecting line that connects the first audio output unit, the second audio output unit, the first pickup unit, and the second pickup unit to ground; and a first set of circuits configured to reduce one or more of:

a first sound leakage signal using the first audio signal, wherein the first sound leakage signal is the first audio signal leaking into the second signal input line from the first audio output unit via the connecting line and the second pickup unit, or a second sound leakage signal using the second audio signal, wherein the second sound leakage signal is the second audio signal leaking into the second signal input line from the second audio output unit via the connecting line and the second pickup unit, wherein the first set of circuits are configured to reduce the first sound leakage signal by adding the first audio signal to the first sound leakage signal, wherein the first audio signal is attenuated based on a sound leakage ratio of the first audio signal leaking into the second pickup unit from the connecting line.

2. The signal processing apparatus according to claim 1, further comprising:

a noise-cancelling unit, provided between the second signal input line and the second pickup unit, and configured to:

perform filter processing on the ambient audio picked up by the second pickup unit;

generate a noise-cancelling signal for cancelling the ambient audio from the audio output of the second audio output unit; and output the noise-cancelling signal to the second audio output unit via the second signal input line, wherein the first set of circuits add the attenuated first audio signal to the first sound leakage signal which is input into the noise-cancelling unit from the second pickup unit.

3. The signal processing apparatus according to claim 1, wherein the first set of circuits are configured to reduce the second sound leakage signal by adding the second audio signal to the second sound leakage signal, wherein the second audio signal is attenuated based on a sound leakage ratio of the second audio signal leaking into the second pickup unit from the connecting line.

4. The signal processing apparatus according to claim 3, further comprising:

a noise-cancelling unit, provided between the second signal input line and the second pickup unit, configured to:

perform filter processing on the ambient audio picked up by the second pickup unit;

generate a noise-cancelling signal for cancelling the ambient audio from the audio output of the second audio output unit; and output the noise-cancelling signal to the second audio output unit via the second signal input line;

wherein the first set of circuits add the attenuated second audio signal to the second sound leakage signal which is input into the noise-cancelling unit from the second pickup unit.

5. The signal processing apparatus according to claim 1, further comprising:

second set of circuits, provided between the first signal input line and the second signal input line, and configured to:

attenuate the first audio signal based on a sound leakage ratio of the first audio signal leaking into the second audio output unit from the first audio output unit via the connecting line, wherein a signal generated from a signal of the ambient audio picked up by the first pickup unit is added on the first signal input line; and output the attenuated first audio signal to the second signal input line.

6. A signal processing method comprising:

in a signal processing apparatus:

outputting, from a first audio output unit, audio based on a first audio signal input from a first signal input line;

picking up ambient audio from a first pickup unit, the first pickup unit connected to the first signal input line;

outputting, from a second audio output unit, audio based on a second audio signal input from a second signal input line;

picking up the ambient audio from a second pickup unit, the second pickup unit connected to the second signal input line;

connecting the first audio output unit, the second audio output unit, the first pickup unit, and the second pickup unit to ground via a connecting line; and reducing, one or more of:

a first sound leakage signal using the first audio signal, wherein the first sound leakage signal is the first audio signal leaking into the second signal input line from the first audio output unit via the connecting line and the second pickup unit, or a second sound leakage signal using the second audio signal, wherein the second sound leakage signal is the second audio signal leaking into the second signal input line from the second audio output unit via the connecting line and the second pickup unit, wherein the first sound leakage signal is reduced by adding the first audio signal to the first sound leakage signal, wherein the first audio signal is attenuated based on a sound leakage ratio of the first audio signal leaking into the second pickup unit from the connecting line.

7. A signal processing apparatus, comprising:

a first audio output unit configured to output audio based on a first audio signal input from a first signal input line;

a first pickup unit, connected to the first signal input line, and configured to pick up ambient audio;

a second audio output unit configured to output audio based on a second audio signal input from a second signal input line;

a second pickup unit, connected to the second signal input line, and configured to pick up the ambient audio;

a connecting line that connects the first audio output unit, the second audio output unit, the first pickup unit, and the second pickup unit to ground;

one or more circuits configured to reduce one or more of:

a first sound leakage signal, which is the first audio signal leaking into the second signal input line from the first audio output unit via the connecting line and the second pickup unit, by using the first audio signal, or a second sound leakage signal, which is the second audio signal leaking into the second signal input line from the second audio output unit via the connecting line and the second pickup unit, by using the second audio signal, wherein the first audio signal is attenuated based on a sound leakage ratio of the first audio signal leaking into the second pickup unit from the connecting line, wherein the one or more circuits are configured to reduce the first sound leakage signal by adding the attenuated first audio signal to the first sound leakage signal; and a noise-cancelling unit, provided between the second signal input line and the second pickup unit, and configured to:

perform filter processing on the ambient audio signal picked up by the second pickup unit;

generate a noise-cancelling signal for outputting audio from the second audio output unit that cancels out the ambient audio; and output the noise-cancelling signal to the second audio output unit via the second signal input line, wherein the one or more circuits add the attenuated first audio signal to the first sound leakage signal which is input into the noise-cancelling unit from the second pickup unit.

8. A signal processing apparatus, comprising:

a first audio output unit configured to output audio based on a first audio signal input from a first signal input line;

a first pickup unit, connected to the first signal input line, and configured to pick up ambient audio;

a second audio output unit configured to output audio based on a second audio signal input from a second signal input line;

a second pickup unit, connected to the second signal input line, and configured to pick up the ambient audio;

a connecting line that connects the first audio output unit, the second audio output unit, the first pickup unit, and the second pickup unit to ground;

one or more circuits configured to reduce one or more of:

a first sound leakage signal, which is the first audio signal leaking into the second signal input line from the first audio output unit via the connecting line and the second pickup unit, by using the first audio signal, or a second sound leakage signal, which is the second audio signal leaking into the second signal input line from the second audio output unit via the connecting line and the second pickup unit, by using the second audio signal, wherein the second audio signal is attenuated based on a sound leakage ratio of the second audio signal leaking into the second pickup unit from the connecting line, wherein the one or more circuits are configured to reduce the second sound leakage signal by adding the attenuated second audio signal to the second sound leakage signal; and a noise-cancelling unit, provided between the second signal input line and the second pickup unit, and configured to:

perform filter processing on the ambient audio signal picked up by the second pickup unit;

generate a noise-cancelling signal for outputting audio from the second audio output unit that cancels out the ambient audio; and output the noise-cancelling signal to the second audio output unit via the second signal input line, wherein the one or more circuits add the attenuated second audio signal to the second sound leakage signal which is input into the noise-cancelling unit from the second pickup unit.

9. A signal processing apparatus, comprising:

a first audio output unit configured to output audio based on a first audio signal input from a first signal input line;

a first pickup unit, connected to the first signal input line, and configured to pick up ambient audio;

a second audio output unit configured to output audio based on a second audio signal input from a second signal input line;

a second pickup unit, connected to the second signal input line, and configured to pick up the ambient audio;

a connecting line that connects the first audio output unit, the second audio output unit, the first pickup unit, and the second pickup unit to ground;

a first set of circuits configured to reduce one or more of:

a first sound leakage signal using the first audio signal, wherein the first sound leakage signal is the first audio signal leaking into the second signal input line from the first audio output unit via the connecting line and the second pickup unit, or a second sound leakage signal using the second audio signal, wherein the second sound leakage signal is the second audio signal leaking into the second signal input line from the second audio output unit via the connecting line and the second pickup unit, and a second set of circuits, provided between the first signal input line and the second signal input line, and configured to:

attenuate the first audio signal based on a sound leakage ratio of the first audio signal leaking into the second audio output unit from the first audio output unit via the connecting line, wherein a signal generated from the ambient audio picked up by the first pickup unit is added on the first signal input line; and output the attenuated first audio signal to the second signal input line.

* * * * *